(12) United States Patent
Liu et al.

(10) Patent No.: US 9,299,064 B1
(45) Date of Patent: Mar. 29, 2016

(54) SCOREBOARDS FOR ELECTRONIC GAMES

(71) Applicant: Amazon Technologies, inc., Reno, NV (US)

(72) Inventors: Jim Liu, Irvine, CA (US); Jason S. Chein, Bellevue, WA (US); David M. Isen, Los Angeles, CA (US); Yuriy Postrekhin, Long Beach, CA (US); Christopher L. Lavin, Seattle, WA (US); Michael Anthony Frazzini, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 549 days.

(21) Appl. No.: 13/625,156

(22) Filed: Sep. 24, 2012

(51) Int. Cl.
   *G06Q 10/10* (2012.01)
(52) U.S. Cl.
   CPC ..................................... *G06Q 10/107* (2013.01)
(58) Field of Classification Search
   CPC ....... H04L 12/588; H04L 51/32; H04L 67/08; H04L 67/104; H04L 67/12; H04L 67/38; H04L 29/08306
   USPC .......................................... 709/206, 207, 208
   See application file for complete search history.

(56) References Cited

U.S. PATENT DOCUMENTS

| | | | |
|---|---|---|---|
| 2003/0177347 A1* | 9/2003 | Schneier et al. ............... | 713/151 |
| 2009/0150872 A1* | 6/2009 | Russell et al. ................ | 717/140 |
| 2011/0296004 A1* | 12/2011 | Swahar ......................... | 709/224 |
| 2012/0142428 A1* | 6/2012 | Wilson et al. ................. | 463/42 |
| 2014/0011573 A1* | 1/2014 | Amaitis et al. ................ | 463/25 |
| 2014/0081438 A1* | 3/2014 | Knutsson ........................ | 700/92 |

* cited by examiner

*Primary Examiner* — David Lazaro
*Assistant Examiner* — Zia Khurshid
(74) *Attorney, Agent, or Firm* — Thomas | Horstemeyer, LLP

(57) ABSTRACT

Game scores are obtained and associated with tiers based at least in part on game scores. Also, social networking contacts who are also players of the game are identified. A scoreboard is generated that shows the tiers, rankings of a respective one of the players, and the social networking contacts who were identified.

19 Claims, 8 Drawing Sheets

_SCOREBOARDS FOR ELECTRONIC GAMES_

BACKGROUND

Electronic games, such as video games, may present interactive challenges and competitions for its players. The players may accumulate scores based on their accomplishments within the electronic games.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
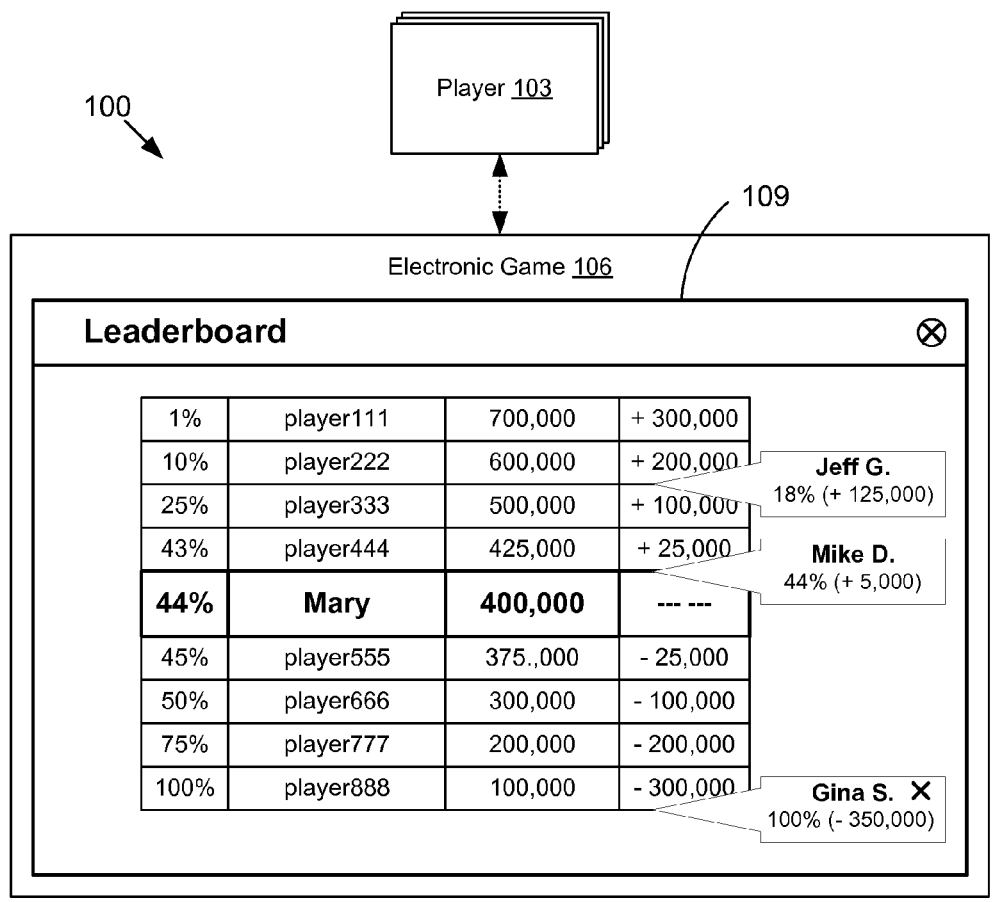
FIG. 1 is a drawing of an example of a gaming environment according to various embodiments of the present disclosure.

The present application is directed towards generating scoreboards that display scores for electronic games. A non-limiting example follows with reference to FIG. 1. FIG. 1 shows an example of a gaming environment 100 in which multiple players 103 interact with and compete in an electronic game 106. In the present example, one of the players 103, Mary, plays the electronic game 106 against several other players 103, including some of her friends with whom she is connected through a social networking site. Mary's top score in the electronic game 106 is about average with respect to the other tens of thousands of players 103 who play this particularly popular game. As such, scrolling through scoreboard that shows a sorted list of the tens of thousands of top scores for all of the players 103 may be impractical and may not give Mary a clear sense of her relative performance in the electronic game 106.

In accordance with the present disclosure, a scoreboard 109 may be generated that displays Mary's percentile ranking, the percentile rankings of her social networking friends, and the percentile rankings of other players 103 at key levels that may be of interest to Mary. Thus, Mary may get a sense of her relative performance with respect to her social networking friends and other key players 103 in the electronic game 106.

In the following discussion, a general description of the system and its components is provided, followed by a discussion of the operation of the same.

Figure 2:
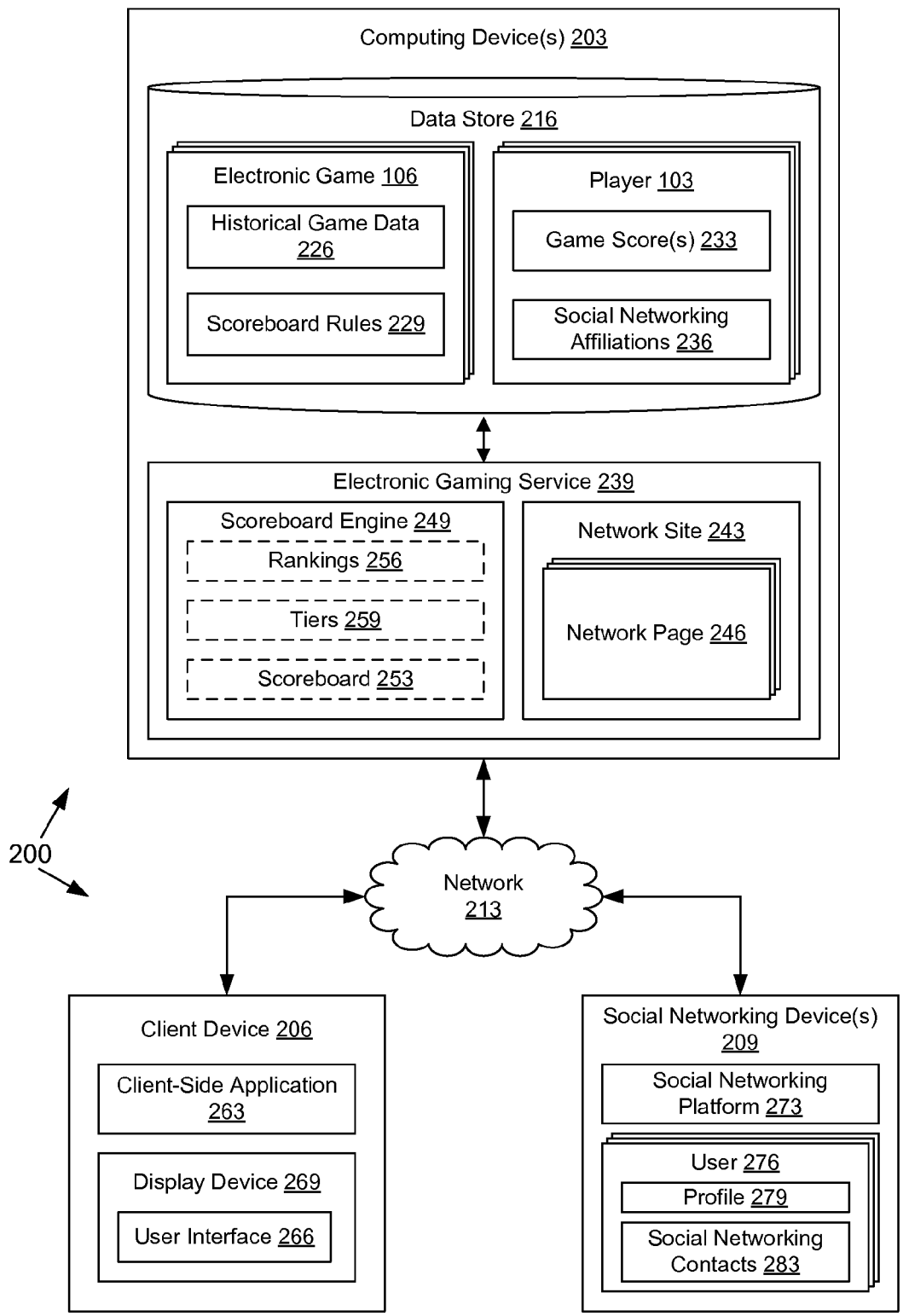
FIG. 2 is a drawing of an example of a networked environment according to various embodiments of the present disclosure.

With reference to FIG. 2, shown is a networked environment 200 according to various embodiments of the present disclosure. The networked environment 200 may include one or more computing devices 203, one or more client devices 206, one or more social networking devices 209, and possibly other devices in data communication through a network 213. The network 213 includes, for example, the Internet, intranets, extranets, wide area networks (WANs), local area networks (LANs), wired networks, wireless networks, other suitable networks, or any combination thereof.

The computing device 203 may comprise, for example, a server computer or any other system providing computing capability. Alternatively, multiple computing devices 203 may be employed that are arranged, for example, in one or more server banks, computer banks, or other arrangements. For example, multiple computing devices 203 together may comprise a cloud computing resource, a grid computing resource, and/or any other distributed computing arrangement. Such computing devices 203 may be located in a single installation or may be distributed among many different geographical locations. For purposes of convenience, the computing device 203 is referred to herein in the singular. Even though the computing device is referred to in the singular, it is understood that multiple computing devices 203 may be employed in the various arrangements as described above.

Various applications and/or other functionality may be executed in the computing device 203 according to various embodiments. Also, various data may be stored in a data store 216 that is accessible to the computing device 203. The data store 216 may be representative of multiple data stores as can be appreciated. The data stored in the data store 216, for example, is associated with the operation of the various applications and/or functional entities that will be described later.

The data store 216 may include information associated with one or more electronic games 106 and players 103 of the electronic games 106. An electronic game 106 may be, for example, any type of single-player or multi-player game played on an electronic device, such as a client device 206. According to various embodiments, each electronic game 106 may have multiple versions that may be played on different gaming platforms. As non-limiting examples of gaming platforms, an electronic game 106 may have different versions that are played on desktop computers, mobile computers, dedicated gaming devices, electronic book readers, and other similar types of devices.

Various data for the electronic games 106 may be obtained by the computing device 203 and stored in the data store 216. For instance, historical game data 226, scoreboard rules 229, and possibly other data for the electronic games 106 may be stored in the data store 216. The historical game data 226 may be data that has been collected over a past period of time. The historical game data 226 may include, for example, past scoring data or other types of data. As will be discussed in more detail later, the scoreboard rules 229 may be rules that determine at least some of the content that is to be displayed when showing, for example, points earned in the electronic game 106 or the relative standings of the players 103.

Each player 103 may be an individual who plays one or more of the electronic games 106. In some embodiments, a player 103 may be multiple individuals who, for example, share a single user account when playing the electronic games 106. Various data may be stored in association with each player 103. For instance, one or more game scores 233, social networking affiliations 236, and potentially other information may be associated with each player 103. Each game score 233 may be, for example, a numerical quantity that corresponds to the level of achievement that a player 103 has attained in an electronic game 106. In some embodiments, all of the game scores 233 for a player 103 may be stored in the data store 216. In other embodiments, only the top game scores 233 may be saved, with the game score 233 being replaced in the event that the player 103 attains a new top game score 233.

The social networking affiliations 236 may represent connections to or relationships with individuals through various online or social networks. For instance, a social networking affiliation 236 may be formed when a direct link between players 103 is formed through a social network. Players 103 who have such a direct link may be regarded as being social networking "friends." As another non-limiting example, a social networking affiliation 236 may be formed when two or more players 103 have direct links to the same user on a social network. Such a relationship may be regarded as being "a friend of a friend." It is understood that players 103 may have additional types of social networking affiliations 236 as well.

Various applications or other functionality may be executed in the computing device 203 according to various embodiments. For example, the computing device 203 may execute an electronic gaming service 239 and potentially other services, applications, processes, systems, engines, or functionality not discussed in detail herein. The electronic gaming service 239 is executed to provide various online gaming resources for players 103 or other visitors. For example, the electronic gaming services 239 may host one or more of the electronic games 106 that are played through a client device 206. Additionally, the electronic gaming services 239 may provide forums or other type of gaming community environments for the players 103. Even further, the electronic gaming service 239 may be operated in conjunction with an electronic commerce system through which the electronic games 106 may be sold, rented, leased, etc.

The electronic gaming service 239 may generate a network site 243, such as a web site, to provide a network presence for the electronic gaming service 239. The network site 243 may encode for display one or more network pages 246 that facilitate the client device 206 accessing the electronic gaming service 239. To this end, the network site 243 may include a network page server that serves data, such as the network pages 246, to the client devices 206 over a protocol such as hypertext transfer protocol (HTTP), simple object access protocol (SOAP), and/or other protocols. Such a network page server may comprise a commercially available network page server such as, for example, Apache® HTTP Server, Microsoft® Internet Information Services (IIS), and/or other network page servers.

The electronic gaming service 239 may also execute a scoreboard engine 249 that generates and encodes for display scoreboards 253 for the electronic games 106. A scoreboard 253 may be a visual representation of the achievements or placement of players 103 for an electronic game 106. As a non-limiting example, a scoreboard 253 may display the names or user names of players 103, their corresponding game scores 233, their standings with respect to other players, and potentially other information. As such, in some embodiments, a scoreboard 253 may be regarded as being a leaderboard for an electronic game 106.

The scoreboard engine 249 may also determine rankings 256 for the players 103. The rankings 256 may indicate the relative standings of the players 103 based at least in part on their game scores 233. The rankings 256 may be expressed, for example, in absolute terms (e.g., "fifth place out of ten places"), as a percentile (e.g., "placed at 50th percent"), or as any other type of representation.

Additionally, the scoreboard engine 249 may associate players 103 with tiers 259. A tier 259 may represent, for example, a group of players 103 that have game scores 233 or rankings 256 within a particular range. As a non-limiting example, players 103 having a ranking 256 in a percentile that is less than 2% may be grouped in a first tier 259, players 103 having a ranking 256 in a percentile greater than or equal to 2% and less than 5% may be grouped into a second tier 259, players having a ranking 256 in a percentile greater than or equal to 5% and less than 10% may be grouped into a third tier 259, and so forth. In some embodiments, the particular range of the game scores 233 that are within a tier 259 may be change based at least in part on, for example, the quantity of the players 103 that play the electronic game 106. Also, in some embodiments, at least a portion of the functionality performed by the scoreboard engine 249 may be performed by the client device 206 to reduce computational loads in the computing device 203.

The client device 206 is representative of a plurality of client devices that may be coupled to the network 213. The client device 206 may comprise, for example, a processor-based system such as a computer system. Such a computer system may be embodied in the form of a desktop computer, a laptop computer, a personal digital assistant, a cellular telephone, a set-top box, a music player, a web pad, a tablet computer system, a game console, an electronic book reader, or any other device with like capability.

The client device 206 may be configured to execute a client-side application 263 and possibly other applications. The client-side application 263 may be executed in the client device 206, for example, to access and render network content served up by the computing device 203 and/or other servers. As such, in some embodiments, the client-side application 263 may be embodied in the form of a web browser. In other embodiments, the client-side application 263 may be embodied as a stand-alone application dedicated to, for example, playing an electronic game 106 and/or rendering scoreboards 253. In some embodiments, the client device 206 may be configured to execute applications beyond the client-side application 263 such as, for example, email applications, instant message applications, and/or other applications.

The client-side application 263 may also generate a user interface 266 that facilitates user interaction with and control of the client device 206. The user interface 266 may include, for example, renderings for the electronic games 106, the scoreboards 253, the network pages 246, and/or other content. The user interface 266 may be rendered on one or more display devices 269 for the client device 206. The display device 269 may comprise, for example, one or more light emitting devices, such as cathode ray tubes (CRTs), liquid crystal display (LCD) screens, light emitting diode (LED) screens, gas plasma-based panel displays, LCD projectors, or other devices of like capability.

The social networking device 209 may comprise, for example, a server computer or any other system providing computing capability. Alternatively, multiple social networking devices 209 may be employed that are arranged, for example, in one or more server banks, computer banks, or other arrangements. For example, multiple social networking devices 209 together may comprise a cloud computing resource, a grid computing resource, and/or any other distributed computing arrangement. Such social networking devices 209 may be located in a single installation or may be distributed among many different geographical locations. For purposes of convenience, the social networking device 209 is referred to herein in the singular. Even though the social networking device 209 is referred to in the singular, it is understood that multiple social networking devices 209 may be employed in the various arrangements as described above. According to some embodiments, the social networking device 209 may be associated with and maintained by the same entity as that controlling the computing device 203. In alternative embodiments, the social networking device 209 may be maintained by a different party.

The social networking device 209 may provide a social networking platform 273 to facilitate online interaction between users 276. The social networking platform 273 may, for example, connect users 276, such as family, friends, and other user 276 who share interests. In some embodiments, the social networking platform 273 may be embodied in the form of, for example, a social networking site and have social networking network pages, such as web pages. For the social networking platform 273, each user 276 may be associated with a profile 279, one or more social networking contacts 283, and potentially other information. The profile 279 may include content provided by the user 276 and/or generated by the social networking device 209. As non-limiting examples, such content may be a short biography, one or more pictures, user demographics, and/or other information.

The social networking contacts 283 may represent other users 276 who have associations with, connections to, or relationships with the respective user 276. For example, the respective user 276 may select friends, family members, co-workers, or other users 276 as being social networking contacts 283. At least some of the users 276 may also be players 103 of one or more electronic games 106. Thus, the social networking affiliations 236 may represent various relationships between users 276 who are social networking contacts 283 and who are also players 103 of one or more the electronic games 106.

Next, a general description of the operation of the various components of the networked environment 200 is provided. To begin, it is assumed that the computing device 203, social networking device 209, and client device 206 are populated with their respective data, powered up, and running.

The scoreboard engine 249 may determine and/or identify the social networking affiliations 236 for one of the players 103. To this end, the computing device 203 may transmit a request for the social networking device 209 to provide a list of the social networking contacts 283 for the user 276 that corresponds to the player 103. In some embodiments, the social networking device 209 may return a list of only the social networking contacts 283 that are also players 103 of one or more of the electronic games 106. In alternative embodiments, the social networking device 209 may return a list of all of the social networking contacts 283 that are associated with the user 276, and the computing device 203 may parse the list to determine the social networking affiliations 236 for the player 103. This process may be repeated for all of the players 103, and the social networking affiliations 236 may be updated from time to time.

With the social networking affiliations 236 determined and/or identified, the scoreboard engine 249 may generate a scoreboard 253, for example, upon receiving a command from a user of the computing device 203 or the client device 206. Additionally, the scoreboard engine 249 may generate the scoreboard 253 automatically from time to time. For instance, the scoreboard engine 249 may generate and/or update a scoreboard 253 hourly, monthly, daily, hourly or at any other time period. The following discussion provides an example, among others, of generating a scoreboard 253 for one of the electronic games 106. A similar process may be performed for additional scoreboards 253 for the same electronic game 106 or for scoreboards 253 of other electronic games 106.

First, the scoreboard engine 249 may obtain the data associated with the players 103 of the electronic game 106, and the rankings 256 of the players 103 may then be determined. As previously mentioned, the ranking 256 for each player 103 may, for example, represent their placement with respect to the other players 103. Accordingly, the ranking 256 may be expressed in absolute terms with respect to the total number of players 103 in the electronic game 106. The scoreboard engine 249 may then associate each of the players 103 with one of the tiers 259 based at least in part on the game scores 233 and/or the previously calculated rankings 256. As previously mentioned, the tiers 259 may represent groups of players 103 that are within a particular percentile range. Thus, as a non-limiting example, players 103 having a ranking 256 in a percentile that is less than 2% may be associated with a first tier 259, players 103 having a ranking 256 in a percentile greater than or equal to 2% and less than 5% may be associated with a second tier 259, players having a ranking 256 in a percentile greater than or equal to 5% and less than 10% may be associated with a third tier 259, and so forth.

Next, the scoreboard engine 249 may select all or a subset of the tiers 259 to be represented in the scoreboard 253. For the embodiments in which a subset of the tiers 259 is selected, the quantity of the tiers 259 that are to be included in the scoreboard 253 may be based at least in part on the scoreboard rules 229. For instance, a scoreboard rule 229 may define that M tiers 259 are to be shown in the scoreboard 253 when the quantity of players 103 for the electronic game 106 is between N and R, wherein M, N, and R are predetermined numbers. Additionally, the scoreboard rules 229 may define the particular tiers 259 that are to be included in the scoreboard 253 based at least in part on the quantity of players 103 for the electronic game 106. As a non-limiting example, a scoreboard rule 229 may define that tiers 259 A, C, F be shown in a scoreboard 253 when there are N players 103, where A, C, and F are particular tiers 259, and N is a predetermined number.

Additionally, for each of the tiers 259 that are to be represented in the scoreboard 253, the scoreboard engine 249 may select one or more of the players 103 and/or their game scores 233 to be shown on the scoreboard 253 in conjunction with the corresponding tier 259. By showing one or more of the game scores 233 in conjunction with the corresponding tier 259, viewers of the scoreboard 253 may get a sense of a game score 233 that is needed in order to be ranked in that tier 259. Additionally, the scoreboard engine 249 may determine a score differential between the game score 233 of a respective player 103, such as the player 103 who is viewing the scoreboard 253, and one or more game scores 233 that correspond to each of the tiers 259. By showing these score differentials, the respective player 103, such as the player 103 viewing the scoreboard 253, may get a sense of the differences between his or her game score 233 and the game scores 233 that are shown for the tiers 259.

Various criteria may be used to determine the players 103 and/or game scores that are to be shown on the scoreboard 253 in conjunction with one or more of the tiers 259. For instance, in some embodiments, the scoreboard 253 may select the respective players 103 and/or game scores 233 to be shown based at least in part on their relative game scores 233 with respect to the other players 103 associated with the tier 259. As non-limiting examples, the highest, lowest, average, or median game scores 233 in each tier 259 may be selected and shown in the scoreboard 253. Additionally, in the event that a respective player 103 has a social networking affiliation 236 in a tier 259, the player 103 who is a social networking affiliation 236 may be shown in conjunction with the tier 259.

Additionally, for the tiers 259 that are ranked higher than a respective player 103, the scoreboard engine 249 may select the game scores 233 that are the lowest in those tiers 259 to be shown in the scoreboard 253. In this way, the respective player 103 may be able to view the lowest game score 233 that he or she must attain in order to advance to a higher-ranked tier 259. Similarly, for the tiers 259 that are ranked lower than the respective player 103, the scoreboard engine 249 may select the game scores 233 that are the highest in those tiers 259 to be shown in the scoreboard 253. In this way, the respective player 103 may be able to view the lowest game score 233 that a player 103 in a lower tier 259 must attain in order to surpass the respective player 103.

The scoreboard engine 249 may also represent the respective player 103 and his or her corresponding game score 233 in the scoreboard 253. Additionally, social networking affiliations 236 may be represented in the scoreboard 253 as well. The scoreboard 253 may include the game scores 233, score differentials between the respective player 103 and the other players 103 being social networking affiliations 236, and possibly additional content. Additionally, the locations of the representations of these players 103 may be positioned relative to the representations of the tiers 259, so that their relative standings may be readily perceived.

It may be the case that the client device 206 and the computing device 203 lose data communication for various reasons. For example, the client device 206 or the computing device 203 may not have access to the network 213, or the client device 206 may enter an "offline mode." As such, caching techniques may be used to facilitate the client 206 viewing a scoreboard 253 and uploading game scores 233 in the event that the client device 206 and the computing device 203 are temporarily unable to communicate. For instance, while the client device 206 is unable to communicate with the computing device 203, new game scores 233 earned in the client device 206 may be cached. Upon the client device 206 being able to communicate with the computing device 203, the new game scores 233 may then be transmitted to the computing device 203. Additionally, the scoreboards 253 transmitted by the computing device 203 may be cached in the client device 206 so that the scoreboards 253 are accessible despite the loss of communication between the computing device 203 and the client device 206.

In some embodiments, the scoreboard engine 249 may also identify players 103 that have social, online, geographical, or other types of connections with a respective one of the players 103 and represent the identified players 103 on the scoreboard 253. For instance, the scoreboard 253 may represent that one or more players 103 are in a same geographical area as a respective player 103, such as the player 103 that is viewing the scoreboard 253. To this end, the players 103 may submit geographical information, for instance, when registering with the electronic gaming service 239. In alternative embodiments, the geographical information may, for instance, be provided by a Global Positioning System (GPS) for the client device 206, obtained or deduced by the computing device 203 through an Internet Protocol (IP) address, or obtained through any other method.

Additionally, the scoreboard engine 249 may identify connections between players 103 based at least in part on email address contacts for the players 103. To this end, the players 103 may provide information associated with their electronic mail address book to the electronic gaming services 239. For instance, information describing electronic mail contacts for the players 103 may be provided to the electronic gaming service 239. The scoreboard engine 249 may use this information to determine whether other players 103 are electronic mail contacts.

In some embodiments, the scoreboard engine 249 may identify connections between players 103 based at least in part on a domain component of an electronic mail address. For the example electronic mail address "user@example.com," the domain component of the electronic mail address may be "example.com." Because a business, school, or other type of organization may provide electronic mail addresses with the same domain component to its members, the scoreboard engine 249 may identify connections between players 103 based at least in part on having the same domain component of an electronic mail address.

The players 103 identified as having social, online, geographical, or other types of connections may be represented on the scoreboard 253. Additionally, the score differentials between a respective player 103 and these identified players 103 may be represented on the scoreboard 253. Also, the represented players 103 may be positioned on the scoreboard in relation to the represented tiers 259, so that their relative rankings 256 may be readily perceived.

The scoreboard engine 249 may also generate one or more additional scoreboards 253 for which representations of the tiers 259 are replaced by, for example, a consecutive listing of the players 103 sorted by their respective game score 233 and/or ranking 259. For such a scoreboard 253, one may be able to scroll through the listing of players 103 and view a representation of each player 103 and corresponding game score 233. Each player 103 may be positioned adjacent to a player 103 having the next immediately higher game score 233 and a player 103 having the next immediately lower game score 233.

It may be the case that some players 103 submit game scores 233 to the electronic gaming service 239 that have not been earned legitimately through playing an electronic game 106. These fraudulent game scores 233 may be much higher than what is possible to obtain by playing the electronic game 106. As such, the scoreboard engine 249 may determine whether game scores 233 that are obtained from the client device 206 are within a predetermined range. Such a range may be provided by, for example, a manager associated with the electronic game 106, such as a game developer. In other embodiments, the scoreboard engine 249 may perform statistical analysis of the game scores 233 for a particular electronic game 106 and determine the predetermined range based on the results of the statistical analysis.

If a game score 233 is outside of the predetermined range, the scoreboard engine 249 may identify that game score 233 as being fraudulent. To the contrary, if a game score 233 is within the predetermined range, the scoreboard engine 249 may determine that the game score 233 is not fraudulent. The scoreboard engine 249 may generate multiple scoreboards 253, wherein one or more of the scoreboards 253 are for non-fraudulent game scores 233 and one or more of the other scoreboards 253 are for fraudulent game scores 233. The players 103 who submit the fraudulent game scores 233 may be provided the scoreboard 253 for the fraudulent game scores 233, while the players 103 who do not submit fraudulent game scores 233 may be provided the scoreboard 253 for the non-fraudulent game scores 233. Thus, players 103 who do not submit fraudulent game scores 233 do not view game scores 233 that have been deemed fraudulent. The players 103 who did submit fraudulent game scores 233 are shown a scoreboard 253 that includes the fraudulent game scores 233. Also, in some embodiments, the scoreboard 253 that includes the fraudulent game scores 233 may further include some non-fraudulent game scores 233.

Additionally, the scoreboard engine 249 may determine a cheater metric for each of the players 103. Such a cheater metric may be, for example, a value that indicates a level at which it is believed that a player 103 is a cheater for the electronic gaming service 239. In some embodiments, the cheater metric may be based at least in part on a quantity of game scores 233 that have been deemed fraudulent. Further, the cheater metric may take into account the number of electronic games 106 for which the player 103 has submitted a fraudulent game score 233. As a non-limiting example, a cheater metric may be determined using the following equation:

$$R = s*g,$$

where R is the cheater metric, s is the quantity of fraudulent game scores 233 submitted by the player 103, and g is the quantity of electronic games 106 for which the player 103 has submitted a fraudulent game score 233.

Using the cheater metrics for the players 103, the electronic gaming service 239 may identify particular players 103 to audit their activity on the electronic gaming service 239. For instance, the electronic gaming service 239 may select players 103 that have a cheater metric that exceeds a particular value and monitor their game scores 233 being submitted. Additionally, the electronic gaming service 239 may refrain from including the game scores 233 for these players 103 in one or more of the scoreboards 253.

Moreover, the electronic gaming service 239 may determine the quantity of fraudulent game scores 233 for each of the electronic games 106. Using these quantities, the electronic gaming service 239 may identify particular electronic games 106 that have relatively high numbers of fraudulent game scores 233 being submitted. The electronic gaming service 239 may notify developers or other agents of the electronic game 106 of the potential issues regarding fraudulent game scores 233 being submitted for their electronic games 106. To this end, the electronic gaming service 239 may transmit an electronic notification to an agent of the electronic game 106.

Figure 3A:
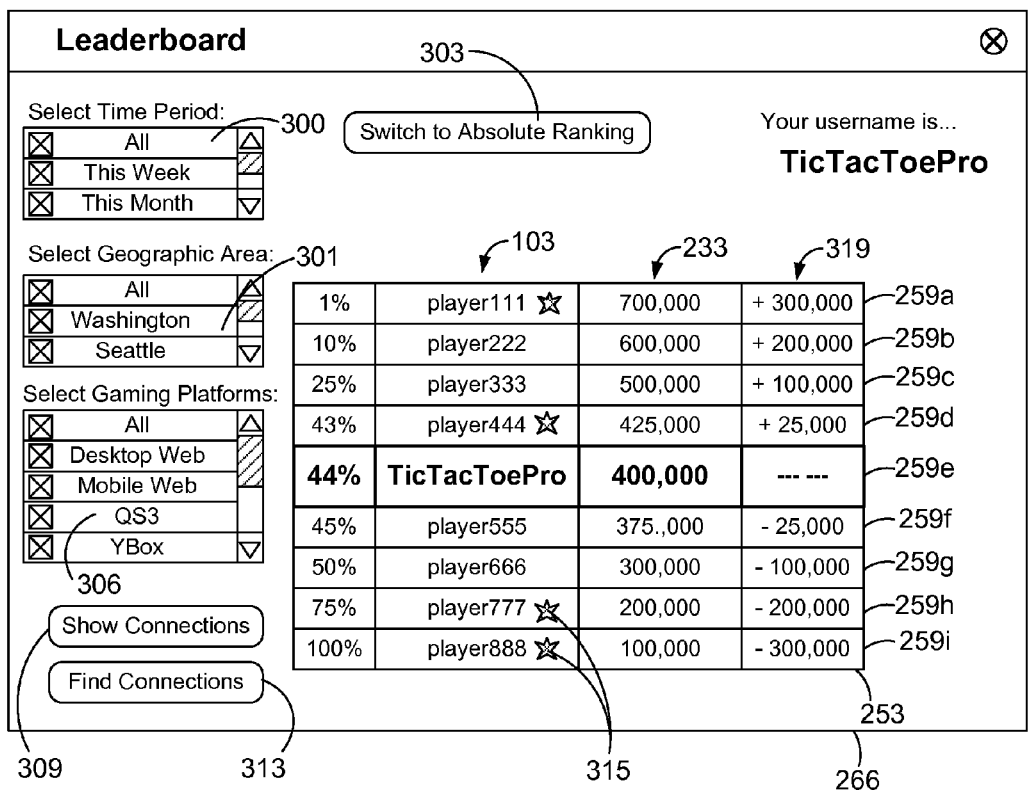
FIGS. 3A-3C are drawings of examples of user interfaces rendered by a client in the networked environment of FIG. 2 according to various embodiments of the present disclosure.

Referring next to FIG. 3A, shown is one example, among others, of a user interface 266 that may be rendered on the display device 269 (FIG. 2) of the client device 206. The user interface 266 shown may be generated upon the respective player 103 TicTacToePro viewing the scoreboard 253. The user interface 266 in the present example includes a rendering of the scoreboard 253, a time selection dropdown list 300, a geographic selection dropdown list 301, a switch scoreboard button 303, a gaming platform selection list 306, a show connections button 309, a find connections button 313, and other features not discussed in detail for brevity.

The rendering of the scoreboard 253 includes rows that represent the tiers 259, referred to herein as the tiers 259a-259i. In the present example, the tier 259a represents the first percentile of the game scores 233, the tier 259b represents the 10th percentile of the game scores 233, the tier 259c represents the 25th percentile of the game scores 233, and so forth. Represented in conjunction with each of the tiers 259a-259i is one of the players 103, the game score 233 for each player 103 shown, and a score differential 319 for each player 103 shown.

In the present example, the players 103 shown in conjunction with the tiers 259a-259d, which represent rankings 256 (FIG. 2) that are higher than the ranking 256 of TicTacToePro, are the players 103 having the lowest game score 233 in their respective tier 259. By showing the lowest ranked player 103 in the tiers 259a-259d that represent higher rankings 256, the player 103 TicTacToePro may get a sense of the minimum game score 233 increase she must attain in order to advance to one of these tiers 259a-259d. Thus, in the example shown, the player 103 TicTacToePro must gain at least 25,000 points towards her game score 233 in order to advance to the tier 259d that represents the 43$^{rd}$ percentile of the players 103.

The players 103 shown in conjunction with the tiers 259f-259i, which represent rankings 256 that are higher than TicTacToePro, are the players 103 that have the highest game score 233 in their respective tier 259. By showing the highest ranking player 103 in the tiers 259f-259i, the player 103 TicTacToePro may get a sense of the minimum game score 233 increase another player 103 must gain in order to advance from a lower tier 259f-259i and surpass the player 103 TicTacToePro.

By selecting one of the rows in the time selection dropdown list 300, a viewer may select the time period for data, such as the game scores 233, that are to be used for the scoreboard 253. For instance, in the event that the viewer selects the "All Time" time button 300c, all of the game scores 233 over the lifetime of the electronic game 106 may be used in determining the rankings 256 and tiers 259. Alternatively, in the event that the viewer selects the "Today" time button 300a, game scores 233 only from the most recent day are used in calculating rankings 256 and the tiers 259. In the event that the viewer selects the "This Week" time button 300b, game scores 233 from the most recent week are used to calculate the rankings 256 and tiers 259 for the scoreboard 253. Similarly, a user may select one or more geographic regions for which data is shown for the scoreboard 253 by using the geographic selection dropdown list 301.

As previously mentioned, the electronic game 106 (FIG. 2) may have multiple versions that may be played on different gaming platforms. In the present embodiment of the user interface 266, the viewer may select the respective gaming platforms for which the game scores 233 are used when generating the scoreboard 253. Thus, the performance for a player 103 may be shown with respect to one or more different gaming platforms.

The switch scoreboard button 303 may facilitate a different style of scoreboard 253 being shown on the user interface 266. In particular, by selecting the switch scoreboard button 303, the user interface 266 and corresponding scoreboard 253 shown in FIG. 3C may be generated, as will be discussed in more detail later.

Additionally, the user interface 266 may include indicators 315 to identify players 103 that are registered through one or more social networking platforms 273 (FIG. 2). In the present example, a viewer may select the indicator 315, and the electronic gaming service 239 (FIG. 2) may facilitate the viewer and the corresponding player 103 becoming social networking contacts 283 (FIG. 2). Thus, the viewer may establish new social networking contacts 283 using the scoreboard 253.

The find connections button 313 may facilitate a respective player 103 finding other players 103 with whom he or she has a pre-existing connection. For instance, by selecting the find connections button 313, the respective player 103 may be prompted to input an electronic mail contacts list, employer name, school affiliation, geographical location, or any other type of information that may facilitate the scoreboard engine 249 (FIG. 2) identifying other players 103 for whom there may be a relationship. By selecting the show connections button 309, the scoreboard engine 249 may identify and show social networking affiliations 236 for a respective player 103, as will now be discussed with reference to FIG. 3B.

Figure 3B:
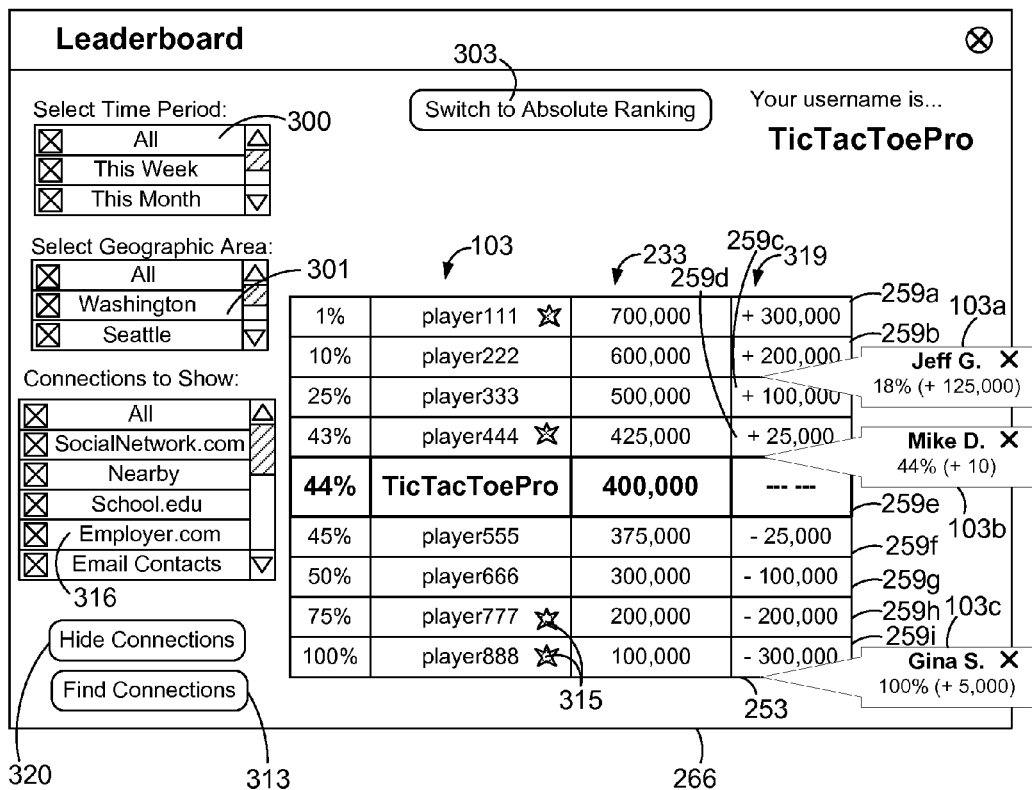

FIG. 3B shows an example, among others, of a user interface 266 that may be rendered, for example, upon the viewer selecting the show connections button 309 (FIG. 3A). The user interface 266 shown includes the rendering of the scoreboard 253, the time selection dropdown list 300, the geographic selection dropdown list 31, the switch scoreboard button 303, the find connections button 313, a connections visibility list 316, a hide connections button 320, and other features not discussed in detail for brevity.

Similar to as discussed above with respect to FIG. 3A, the rendering of the scoreboard 253 includes rows that represent the tiers 259a-259i, players 103, game scores 233, and score differentials 319. In addition, the scoreboard 253 now shows additional players 103, referred to herein as the players 103a-103c, who have been identified as having a social networking affiliation 236 (FIG. 2) with the respective player 103 TicTac-ToePro. In the present example, the players 103a-103d are represented by boxes that indicate their rankings 256 (FIG. 2) with respect to the tiers 259. For example, the player 103a, who has a percentile ranking of 18%, is represented by a box that leads to a location that is between the tier 259b, which represents the 10% ranking 256, and the tier 259c, which represents the 25% ranking 256. Thus, the scoreboard 253 visually presents that the player 103a as being ranked between the tier 259b and the tier 259c. In some alternative embodiments, the additional players 103a-103c who have been identified as having a social networking affiliation 236 with the respective player 103 TicTacToePro may be represented in additional rows in the scoreboard 253. These rows may be located, for example, so that their placement shows the rankings 256 of the players 103a-103c with respect to the tiers 259.

The connections visibility list 316 may facilitate a viewer selecting groups of particular social networking affiliations 236 or other types of connections to be shown in conjunction with the scoreboard 253. As a non-limiting example, it may be selected that social networking affiliations 236 from a respective social networking platform 273 (FIG. 2) be shown and that players 103 located in the same geographical location not be shown.

In the event that a viewer selects the switch scoreboard button 303, the scoreboard engine 249 may generate a scoreboard 253 that presents different content. For instance, as will be discussed with reference to FIG. 3C, a scoreboard 253 showing a consecutive listing of the players 103 sorted by their respective ranking 256 may be generated.

Figure 3C:
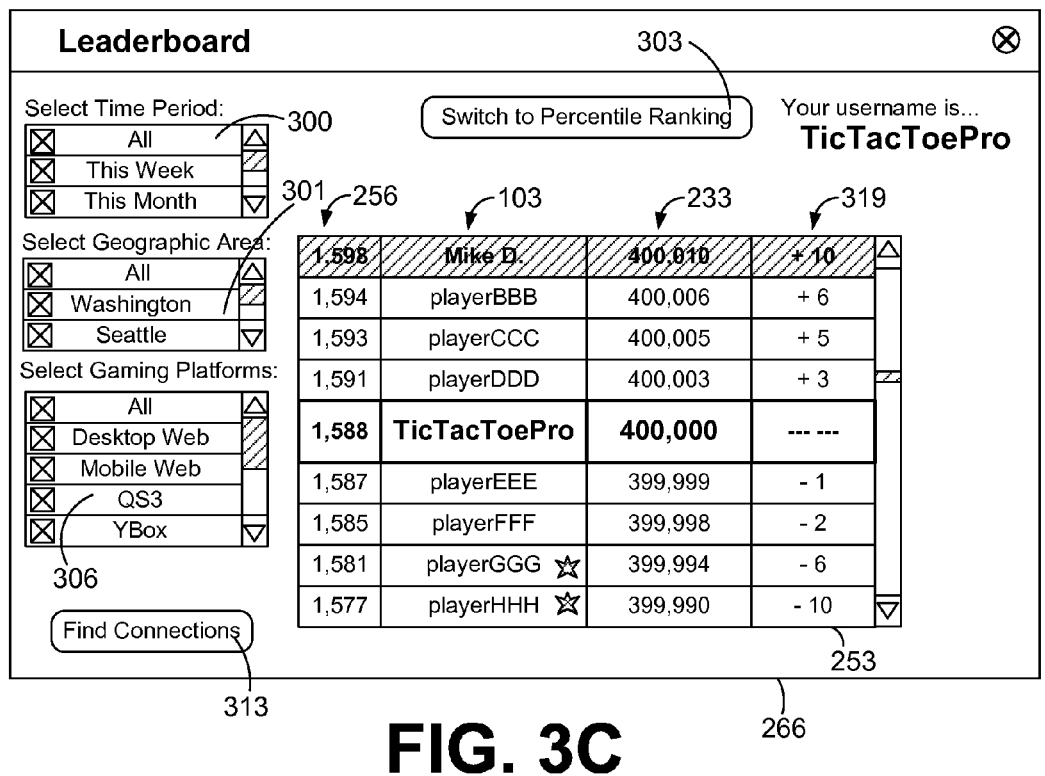

FIG. 3C shows one example, among others, of a user interface 266 that may be rendered on the display device 269 (FIG. 2). The user interface 266 in the present example includes a rendering of the scoreboard 253, the time buttons 300a-300c, the switch scoreboard button 303, the gaming platform selection list 306, the find connections button 313, and other features not discussed for brevity.

The scoreboard 253 includes a consecutive listing of the players 103 sorted by their respective rankings 256. In the scoreboard 253 shown, each row corresponds to one of the players 103. Shown in conjunction with each of the players 103 is a corresponding ranking 256, game score 233, and score differential 319. A viewer may scroll through the scoreboard 253 to view the various content presented. The viewer may also select the find connections button 313 to discover other players 103 with whom the viewer has a pre-existing connection.

Similar to as previously discussed, a viewer may select one or more of the gaming platforms for which data is to be included in the scoreboard 253 by using the gaming platform selection list 306. Additionally, the viewer may select the time period for the data, such as the game scores 233, that are to be used for the scoreboard 253 by using the time buttons 300a-300c. Also, the viewer may select the switch scoreboard button 303 to cause the scoreboard engine 249 to, for example, present the scoreboard 253 shown in FIG. 3A or FIG. 3B.

A viewer may wish to scroll through the listing of the players 103 while still viewing information corresponding to a respective one of the players 103. As such, the user interface 266 may show the information for the respective one of the players 103 despite the scrolling location within the listing of the players 103. For instance, in the present example, if a viewer were to scroll down the list (e.g., to view lower ranked players 103), the information for the player 103 TicTacToePro may remain visible towards the top portion of the scoreboard 253. Similarly, if a viewer were to scroll up the list (e.g., to view higher ranked players 103), the information for the player 103 TicTacToePro may remain visible towards the bottom portion of the scoreboard 253. The information for TicTacToePro would be visible despite the scrolling location. Similar functionality may be included for user interfaces 266 shown in FIGS. 3A-3B as well.

Figure 4:
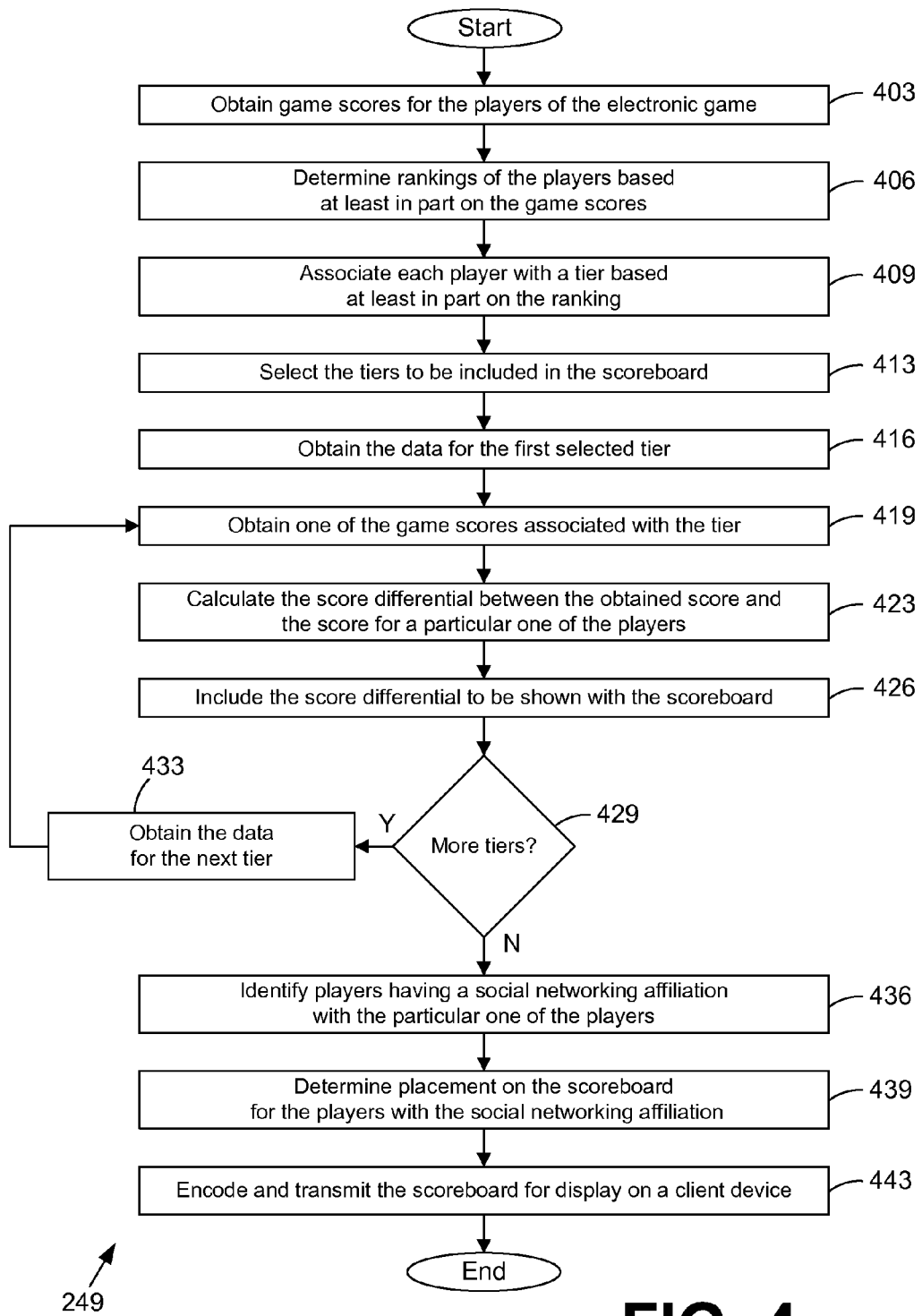
FIGS. 4-5 are flowcharts illustrating one example of functionality implemented as portions of a scoreboard engine executed in a computing device in the networked environment of FIG. 2 according to various embodiments of the present disclosure.

Referring next to FIG. 4, shown is a flowchart that provides one example of the operation of a portion of the scoreboard engine 249 according to various embodiments of the present disclosure. In particular, FIG. 4 shows an example of the scoreboard engine 249 generating scoreboards 253 in accordance with the present disclosure. It is understood that the flowchart of FIG. 4 provides merely an example of the many different types of functional arrangements that may be employed to implement the operation of the portion of the scoreboard engine 249 as described herein. As an alternative, the flowchart of FIG. 4 may be viewed as depicting an example of steps of a method implemented in the computing device 203 (FIG. 2) according to one or more embodiments.

Beginning with box 403, the scoreboard engine 249 obtains the game scores 233 (FIG. 2) for the players 103 (FIG. 2) of the electronic game 106 (FIG. 2). Next, the ranking 256 (FIG. 2) for each of the players 103 is determined based on their game scores 233, as shown in box 406. The scoreboard engine 249 then moves to box 409 and associates each player 103 with one of the tiers 259 (FIG. 2). The players 103 may be associated with the tiers 259, for example, based at least in part on the rankings 256 that were calculated in box 406.

As shown in box 413, the scoreboard engine 249 then selects one or more of the tiers 259 that are to be included in the scoreboard 253. As previously mentioned, the scoreboard rules 229 (FIG. 2) may define the quantity and/or the particular tiers 259 that are to be included with the scoreboard 253. For instance, a scoreboard rule 229 may define that M tiers 259 are to be shown in the scoreboard 253 when the quantity of players 103 for the electronic game 106 is between N and R, wherein M, N, and R are predetermined numbers.

The scoreboard engine 249 may then move to box 416 and obtain the data for the first selected tier 259. As shown in box 419, a game score 233 for one of the players 103 associated with the tier 259 is selected to be shown in conjunction with the scoreboard 253. The scoreboard engine 249 then moves to box 423 and calculates the score differential 319 between the game score 233 obtained in box 419 and the game score 233 for a respective one of the players 103. The respective one of the players 103 may be, for example, the player 103 for whom the scoreboard 253 is being generated and who will be viewing the scoreboard 253. The scoreboard engine 249 then includes the score differential 319 to be shown with the scoreboard 253, as shown in box 426.

In box 429, the scoreboard engine 249 determines whether there are additional tiers 259 that were selected in box 413. If so, the scoreboard engine moves to box 433, the data for the next tier 259 is obtained, and the process is repeated as shown. Otherwise, the scoreboard engine 249 moves to box 436 and identifies one or more players 103 that have a social networking affiliation with a respective one of the players 103. As previously mentioned the respective one of the players 103 may be, for example, the player 103 for whom the scoreboard 253 is being generated and who will be viewing the scoreboard 253. The scoreboard engine 249 may then move to box 439 and determine the placement on the scoreboard 253 for the players 103 that were identified in box 436. The scoreboard 253 may then be encoded for rendering and transmitted to the client device 206 (FIG. 2) for display on the display device 269 (FIG. 2), as shown in box 443. Thereafter, the process ends.

Figure 5:
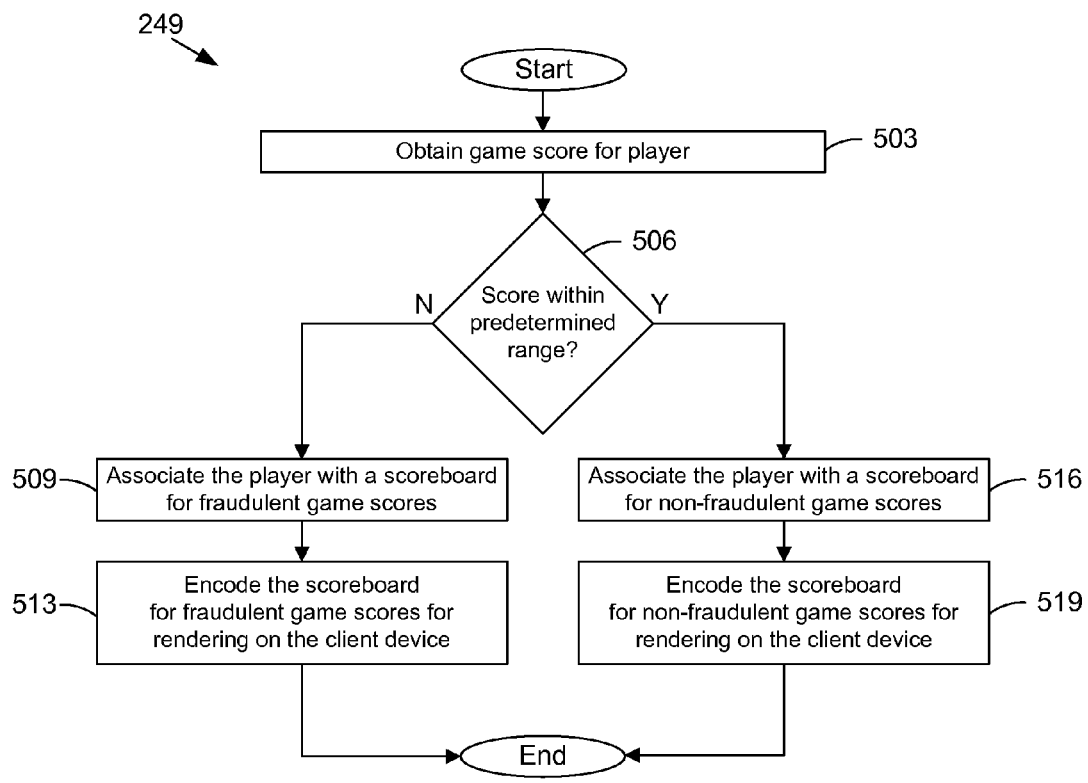

Referring now to FIG. 5, shown is a flowchart that provides another example of the operation of a portion of the scoreboard engine 249 according to various embodiments of the present disclosure. In particular, FIG. 5 shows an example of the scoreboard engine 249 detecting fraudulent game scores 233 (FIG. 2) and generating a scoreboard 253 (FIG. 2) for fraudulent game scores 233 and a scoreboard 253 for non-fraudulent game scores 233. It is understood that the flowchart of FIG. 5 provides merely an example of the many different types of functional arrangements that may be employed to implement the operation of the portion of the scoreboard engine 249 as described herein. As an alternative, the flowchart of FIG. 5 may be viewed as depicting an example of steps of a method implemented in the computing device 203 (FIG. 2) according to one or more embodiments.

Beginning with box 503, the scoreboard engine 249 obtains the game score 233 from the client device 206 (FIG. 2). Next, the scoreboard engine 249 determines whether the game score 233 is within a predetermined range, as shown in box 506. The predetermined range may be set, for example, by a manager, such as a developer, of the electronic game 106 (FIG. 1). If the game score 233 is determined to be fraudulent, the scoreboard engine 249 moves to box 509 and associates the player 103 (FIG. 1) and the corresponding game score 233 with the scoreboard 253 for the fraudulent game scores 233. The scoreboard 253 is then encoded and transmitted to the client device 206 for rendering on the client device, as shown in box 513.

If the game score 233 is within the predetermined range, the scoreboard engine moves to box 516 and associates the player 103 and the corresponding game score 233 with the scoreboard 253 for non-fraudulent game scores 233. Next, the scoreboard 253 is encoded and transmitted to the client device 206 for rendering on the client device 206, as shown in box 519.

Figure 6:
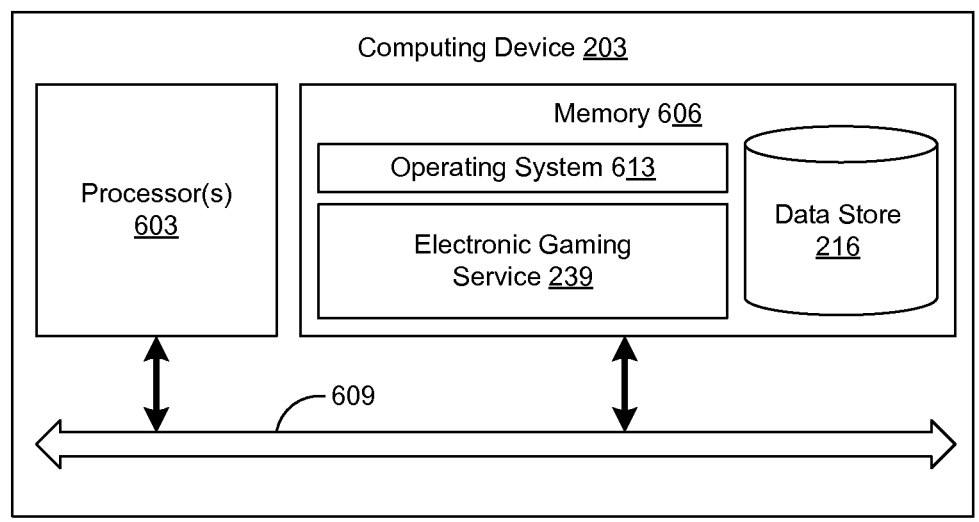
FIG. 6 is a schematic block diagram that provides one example illustration of a computing device employed in the networked environment of FIG. 2 according to various embodiments of the present disclosure.

With reference to FIG. 6, shown is a schematic block diagram of the computing device 203 according to an embodiment, among others, of the present disclosure. The computing device 203 includes at least one processor circuit, for example, having a processor 603 and a memory 606, both of which are coupled to a local interface 609. To this end, the computing device 203 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 is the electronic gaming service 239 and potentially other applications. Also stored in the memory 606 may be the data store 216 and other data. In addition, an operating system 513 may be stored in the memory 606 and executable by the processor 603.

It is understood that there may be other applications that are stored in the memory 606 and are executable by the processors 603 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), a hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network 213 (FIG. 2) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the electronic gaming service 239 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIGS. 4-5 show the functionality and operation of an implementation of portions of the scoreboard engine 249 (FIGS. 4-5). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowchart of FIGS. 4-5 show a specific order of execution, it is understood that the order of execution may differ from that which is depicted. For example, the order of execution of two or more blocks may be scrambled relative to the order shown. Also, two or more blocks shown in succession in FIGS. 4-5 may be executed concurrently or with partial concurrence. Further, in some embodiments, one or more of the blocks shown in FIGS. 4-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic gaming service 239, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It is emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising program instructions, that when executed, cause the computing device to at least:
   obtain a plurality of game scores for a plurality of players of an electronic game;
   determine that the plurality of game scores are within a predetermined range that indicates that the plurality of game scores are not fraudulent;
   determine a plurality of rankings for the plurality of players;
   associate individual ones of the plurality of players with respective ones of a plurality of tiers based at least in part on the plurality of rankings, wherein individual ones of the plurality of tiers are associated with respective ones of a plurality of percentile ranges of the plurality of rankings;
   identify at least one of the plurality of players as having a social networking affiliation with another player of the plurality of players, the social networking affiliation comprising at least one of:
      being a social networking contact for the another player through a social networking platform;
      sharing a common social networking contact for the another player through the social networking platform;
      having a same domain component of an electronic mail address as the another player;
      being an electronic mail contact for the another player; or
      being in a same geographical area as the another player; and
   generate a scoreboard for the electronic game, the scoreboard representing at least the plurality of tiers and at least one of the plurality of game scores for individual ones of the plurality of tiers;
   encode at least a portion of the scoreboard for display on a client device with a representation of at least:
      a selected subset of the plurality of tiers;
      at least one of the plurality of game scores for individual ones of the plurality of tiers;
      a first ranking for the another player; and
      a second ranking for the at least one of the plurality of players that have the social networking affiliation with the another player, wherein the second ranking is presented relative to the selected subset of the plurality of tiers.

2. The computer-readable medium of claim 1, wherein the scoreboard is for a plurality of versions of the electronic game played on a plurality of different gaming platforms.

3. The computer-readable medium of claim 1, wherein the program instructions are further configured to cause the computing device to at least facilitate adding one of the plurality of players as an additional social networking contact.

4. A method, comprising:
   obtaining, in at least one computing device, a plurality of game scores for a plurality of players of an electronic game;

associating, in the at least one computing device, individual ones of the plurality of players with respective ones of a plurality of tiers based at least in part on the plurality of game scores;

identifying, in the at least one computing device, at least one of the plurality of players as having a social networking affiliation with another player of the plurality of players, wherein the social networking affiliation comprises at least one of: being a social networking contact for the another player through a social networking platform;

sharing a common social networking contact for the another player through the social networking platform;

having a same domain component of an electronic mail address as the another player;

being an electronic mail contact for the another player; or being in a same geographical area as the another player;

generating, in the at least one computing device, a scoreboard representing at least the plurality of tiers and at least one of the plurality of game scores for individual ones of the plurality of tiers; and encoding, in the at least one computing device, for display on a client device, at least a portion of the scoreboard with a representation of at least:

a selected subset of the plurality of tiers;

a first ranking of the another player, the first ranking being shown relative to the selected subset of the plurality of tiers; and a second ranking for the at least one of the plurality of players having the social networking affiliation with the another player, the second ranking being shown relative to the selected subset of the plurality of tiers.

5. The method of claim 4, further comprising calculating, in the at least one computing device, a score differential between a game score for the another player and at least one of the game scores for at least one of the plurality of tiers in the selected subset, wherein the representation for the scoreboard further represents the score differential.

6. The method of claim 4, wherein a quantity of the plurality of tiers in the selected subset changes based at least in part on a number of the plurality of players for the electronic game.

7. A system, comprising:

at least one computing device; and a scoreboard system executable in the at least one computing device, wherein the scoreboard system, when executed, causes the at least one computing device to at least:

obtain a plurality of game scores for a plurality of players of an electronic game;

determine a plurality of rankings for the plurality of players;

associate individual ones of the plurality of players with respective ones of a plurality of tiers based at least in part on the plurality of game scores;

identify at least one of the plurality of players has having a social networking affiliation with another player of the plurality of players, wherein the social networking affiliation comprises at least one of:

being a social networking contact for the another player through a social networking platform;

sharing a common social networking contact for the another player through the social networking platform;

having a same domain component of an electronic mail address as the another player;

being an electronic mail contact for the another player; or being in a same geographical area as the another player;

generate a scoreboard for an electronic game, the scoreboard representing at least the plurality of tiers and at least one of the plurality of game scores for individual ones of the plurality of tiers;

encode for display on a client device at least a portion of the scoreboard with a representation of at least:

a first ranking and a second ranking, the first ranking being for another player of the plurality of players of the electronic game, the second ranking being for a social networking contact of the another player, the first ranking and the second ranking being presented in conjunction with the listing of the plurality of tiers; and a plurality of score differentials between the another player and a subset of the plurality of players, wherein individual ones of the plurality of score differentials are presented in conjunction with respective ones of the plurality of tiers.

8. The system of claim 7, wherein the scoreboard is for a plurality of versions of the electronic game played on a plurality of different gaming platforms.

9. The system of claim 8, wherein the scoreboard system further causes the at least one computing device to at least facilitate a user selecting a subset of the plurality of different gaming platforms for which the scoreboard is generated.

10. The system of claim 7, wherein the scoreboard further represents an additional score differential between the another player and the social networking contact, the additional score differential being presented in conjunction with the social networking contact.

11. The system of claim 7, wherein the scoreboard system is further configured to cause the at least one computing device to generate a second scoreboard for the electronic game, the second scoreboard representing an additional listing of an additional subset of the plurality of players that is sorted based at least in part on a plurality of game scores.

12. The system of claim 11, wherein the scoreboard system is further configured to cause the at least one computing device to determine whether to encode, for rendering on a client device, the second scoreboard based at least in part on a quantity of the plurality of players for the electronic game.

13. The system of claim 12, wherein the second scoreboard is encoded for rendering on the client device upon the quantity of the plurality of players for the electronic game being less than a predetermined threshold.

14. The system of claim 7, wherein the scoreboard system is further configured to cause the at least one computing device to facilitate a user selecting a time period range for the scoreboard.

15. The system of claim 7, wherein the scoreboard system is further configured to cause the at least one computing device to facilitate adding at least one of the plurality of players as an additional social networking contact.

16. A system, comprising:

at least one computing device; and a scoreboard system executable in the at least one computing device, wherein the scoreboard system, when executed, causes the at least one computing device to at least:

obtain a plurality of game scores for a plurality of players of an electronic game;

associate individual ones of the plurality of players with respective ones of a plurality of tiers based at least in part on the plurality of game scores;

identify at least one of the plurality of players as having a social networking affiliation with another player of the plurality of players, wherein the social networking affiliation comprises at least one of:

being a social networking contact for the another player through a social networking platform;

sharing a common social networking contact for the another player through the social networking platform;

having a same domain component of an electronic mail address as the another player;

being an electronic mail contact for the another player; or being in a same geographical area as the another player;

generate a scoreboard representing at least the plurality of tiers and at least one of the plurality of game scores for individual ones of the plurality of tiers; and encode for display on a client device at least a portion of the scoreboard with a representation of at least:

a selected subset of the plurality of tiers;

a first ranking of the another player, the first ranking being shown relative to the selected subset of the plurality of tiers; and a second ranking for the at least one of the plurality of players having the social networking affiliation with the another player, the second ranking being shown relative to the selected subset of the plurality of tiers.

17. The system of claim 16, wherein the scoreboard system further causes the at least one computing device to at least calculate a score differential between a game score for the another player and at least one of the game scores for at least one of the plurality of tiers in the selected subset, wherein the representation for the scoreboard further represents the score differential.

18. The system of claim 16, wherein a quantity of the plurality of tiers in the selected subset changes based at least in part on a number of the plurality of players for the electronic game.

19. The system of claim 16, wherein the scoreboard is for a plurality of versions of the electronic game played on a plurality of different gaming platforms.

* * * * *